United States Patent [19]

Chiba et al.

[11] Patent Number: 4,458,921
[45] Date of Patent: Jul. 10, 1984

[54] SEAT BELT TENSIONING DEVICE

[75] Inventors: Masakazu Chiba; Fumio Matsuoka, both of Susono, Japan

[73] Assignee: Toyota Jidosha Kabushiki Kaisha, Aichi, Japan

[21] Appl. No.: 400,353

[22] Filed: Jul. 21, 1982

[30] Foreign Application Priority Data

Aug. 12, 1981 [JP] Japan .................. 56-119701[U]

[51] Int. Cl.³ ............................................ B60R 21/10
[52] U.S. Cl. ..................................... 280/806; 60/635; 60/638; 227/9
[58] Field of Search ................... 280/805, 806; 60/632, 60/635, 638; 227/9, 10, 11

[56] References Cited

U.S. PATENT DOCUMENTS 3,871,470 3/1975 Schwanz et al. .................. 280/806
4,328,976 5/1982 Tsuge et al. ....................... 280/806

Primary Examiner—Joseph F. Peters, Jr.
Assistant Examiner—Kenneth R. Rice
Attorney, Agent, or Firm—Parkhurst & Oliff

[57] ABSTRACT

A seat belt tensioning device provided with a cylinder attached to the room of a vehicle, a piston slidably inserted into the cylinder, a rod of which one end is connected to the piston within the cylinder and of which the other end is connected to a seat belt outside of the cylinder through a joint member, and a piston operating means for moving the piston in one direction at an urgent time, is disclosed. The device is further provided with a piston operating energy absorbing member which is disposed between the joint member and the opposed end wall of the cylinder. When the piston moves to its limit stroke, the piston operating energy absorbing member is strongly sandwiched by the joint member and the end wall of the cylinder and is deformed by a predetermined load applied thereto to absorb the piston operating energy.

16 Claims, 7 Drawing Figures

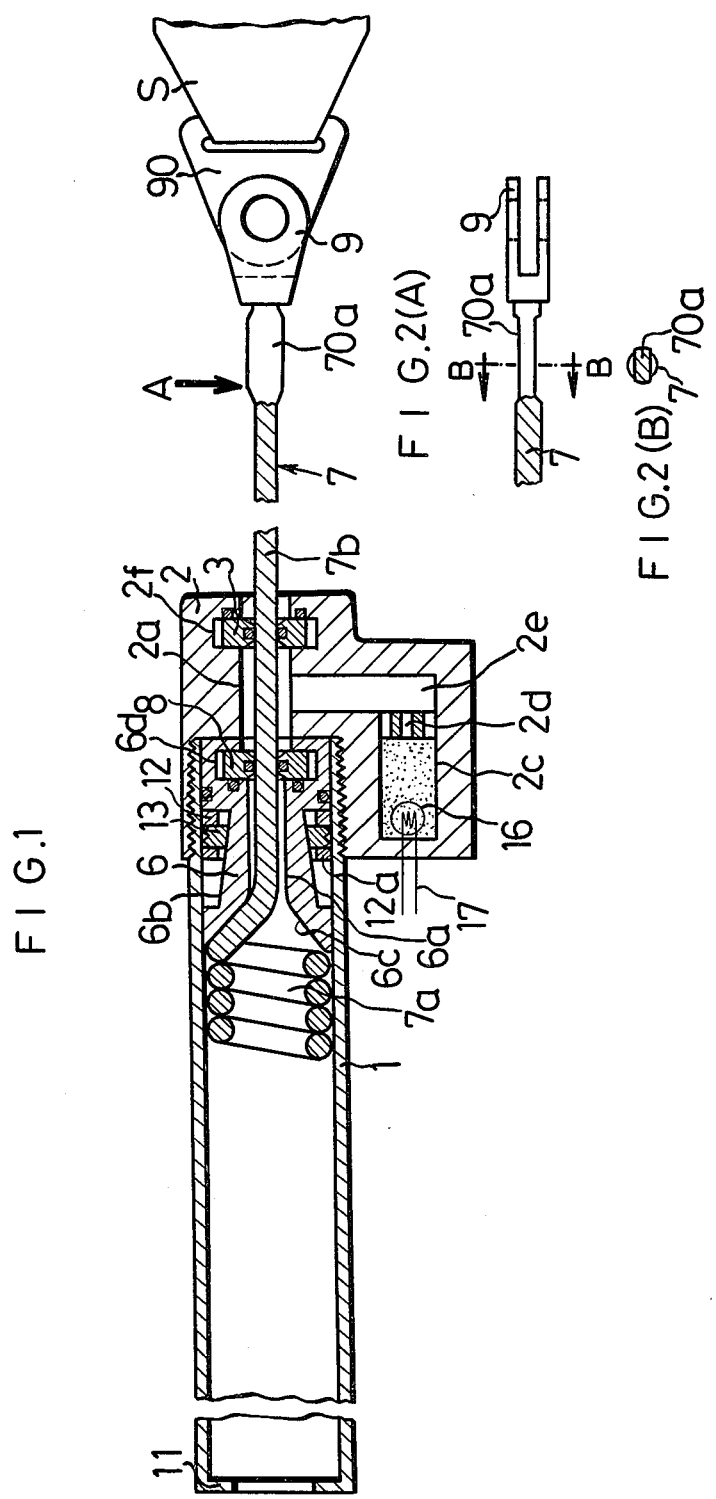

SEAT BELT TENSIONING DEVICE

BACKGROUND OF THE INVENTION

The present invention relates to a seat belt tensioning device of a piston-cylinder type.

The seat belt tensioning device of this type is provided with a cylinder, a piston which is disposed within the cylinder and is connected to a seat belt outside of the cylinder through a rod, and a piston operating means which operates at an urgent time such as upon a vehicle impact to move the piston in one direction.

At an urgent time, the piston operating means operates to move the piston so as to tension the seat belt. As a result, the occupant or passenger is restrained on his seat.

The piston operating means could have applied gas pressure, spring force or the like to the piston to move the piston at an urgent time.

When the occupant does not wear the seat belt to which the piston of the seat belt tensioning device of the above type is connected, or he wears the seat belt with an excessively large slack, the piston is moved to its full stroke by the operation of the piston operating means at an urgent time since no tension force is exerted on the seat belt.

As a result, there is a fear that the piston collides against the end wall of the cylinder. By increasing the wall thickness of the cylinder, the damage of the device due to the above collision can be prevented. But, when the wall thickness of the cylinder is increased, the size and the weight of the device becomes large.

Accordingly, one object of the present invention is to provide a seat belt tensioning device of a piston-clyinder type, of which piston does not damage the cylinder even when the piston moves to its full stroke and collides against the end of the cylinder.

Another object of the present invention is to provide a seat belt tensioning device of a piston-cylinder type, which is provided with a means of absorbing piston operating energy when the piston moves by a predetermined stroke.

DESCRIPTION OF THE DRAWINGS

Other objects and advantages of the invention will become apparent from the following description of embodiments thereof with reference to the accompanying drawings wherein:

FIG. 1 is a longitudinal sectional view of a first embodiment of the seat belt tensioning device according to the present invention;

FIG. 2(A) is a view illustrating one portion of the first embodiment taken in the direction of A of FIG. 1;

FIG. 2(B) is a sectional view of the first embodiment taken along the line B-B of FIG. 2(A);

SUMMARY OF THE INVENTION

Figure 3:
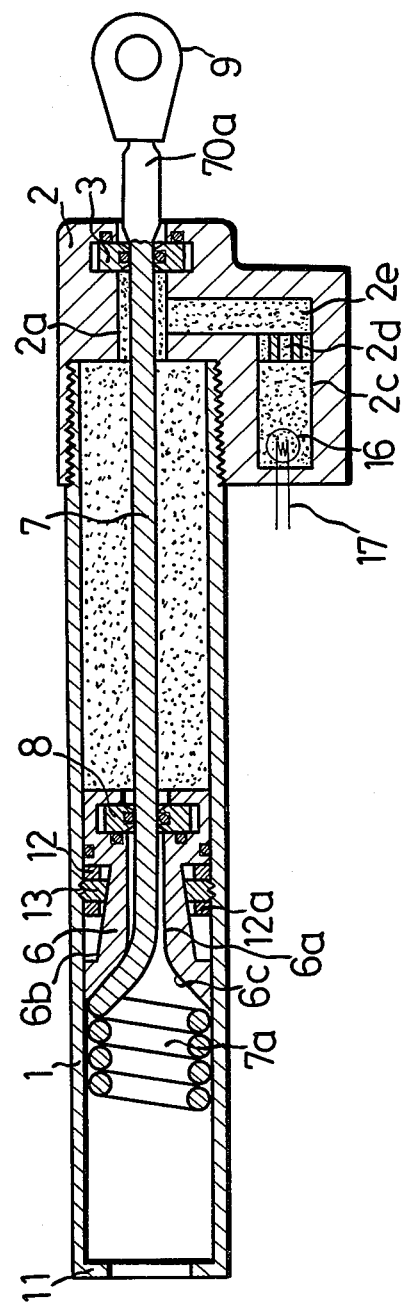
FIG. 3 is a view illustrating a first embodiment of the seat belt tensioning device according to the present invention under operation.

The seat belt tensioning device of the present invention is provided with a cylinder attached to the room of a vehicle; a piston inserted into the cylinder, a rod, one end of which is connected to the piston and the other end of which extends outside of the cylinder by way of a narrow through hole formed in one end wall of the cylinder and is connected to the seat belt through a joint member and a piston operating means for moving the piston in one direction at an urgent time such as upon a vehicle impact.

The seat belt tensioning device of the present invention is further provided with a piston operating energy absorbing member which is disposed between the joint member and the opposed end wall of the cylinder through which the rod extends. When the piston moves to its limit stroke, the piston operating energy absorbing member is strongly sandwiched between the joint portion and the opposed end wall of the cylinder, and is deformed by a predetermined load applied thereby to absorb the piston operating energy.

DETAILED DESCRIPTION OF THE INVENTION

Hereinafter, the present invention will be explained in detail in accordance with the embodiments with reference to the accompanying drawings.

FIGS. 1 and 2 illustrate a first embodiment of the present invention. Within a cylinder 1, a piston 6 is disposed so as to move in one direction. The rod 7 is inserted into the piston 6 and a coil portion 7a which is formed in one end of the rod 7 is engaged with the piston 6. Another end of the rod 7 is connected to an anchor plate 90 of a seat belt S by means of a joint member 9.

An energy absorbing member 70a for absorbing the operating force of the piston 6 is formed in the end portion of the rod, 7, to which the joint member 9 is connected.

Both axially end portions of the outer peripheral surface of the piston 6 form sliding surfaces relative to the cylinder 1. And the axially central portion of the outer peripheral surface of the piston 6 forms a tapered inclined surface 6b. The piston 6 is provided with a through hole 6a extending in the axial direction thereof. The inner end of the through hole 6a forms a tapered die portion 6c of which diameter increases toward the moving direction of the piston 6.

In the gap formed between the inclined surface 6b and the inner peripheral surface of the cylinder 1, a ring-shaped retaining member 12 is disposed. In the retaining member 12, a plurality of guide holes 12a are radially formed and stopper pieces 13 are inserted into the guide holes 12a so as to slide in the radial direction of the retaining member 12. Each stopper piece 13 is supported by the inclined surface 6b in the bottom thereof. And the sharp end portion of each stopper piece is opposed to the inner peripheral surface of the cylinder 1 so as to slide relative thereto.

The rod 7 is formed of a round steel material and is composed of a coil portion 7a and a straight portion 7b. The top end of the straight portion 7b is formed flat by applying pressure from both sides thereof in the opposite directions. The flat top end of the straight portion 7b acts as an energy absorbing portion 70a. The energy absorbing portion 70a is attached to the joint member 9 to which the seat belt is connected.

The coil portion 7a is engaged with the die portion 6c within the cylinder 1 and the straight portion 7b is inserted into the through hole 6a of the piston 6 and the through hole 2a formed in a cylinder head 2.

In the cylinder head 2 which is screwed to the end of the cylinder 1, and the piston 6, ring-shaped grooves 2f, 6d are formed around the through holes 2a, 6a. And a ring shaped metallic sealing members 3, 8 are slidably inserted into the grooves 2f, 6d, respectively.

In the lower portion of the cylinder head 2, a powder chamber 2c is provided. The powder chamber 2c is communicated with the interior of the cylinder 1 by way of the through hole 2a.

Within the powder chamber 2c, a propellant is charged. And an ignition filament 16 is buried within the propellant.

The ignition filament 16 is connected to an impact sensor (not shown) which detects a vehicle impact and generates an electric current, by means of a lead wire 17. Thus, the piston driving means is constructed.

Next, the normal operation of the seat belt tensioning device having the above described construction will be explained.

Upon a vehicle impact, the impact sensor supplies an electric signal into the ignition filament 16 to generate heat. Then, the propellant is burnt to generate a plenty of gas.

This high pressure gas operates upon the piston 6 so that the piston 6 moves to the left from the position shown in FIG. 1.

As a result, the seat belt connected to the piston 6 through the rod 7 and the joint member 9 is tensioned.

When the tension force of the seat belt becomes equal to the gas pressure within the cylinder 1, the piston 6 stops tensioning the seat belt.

After the piston 6 stopped, the retaining member 12 which retains the stopper pieces 13 continues moving to the left in FIG. 1 due to the inertia force thereof.

And the stopper pieces 13 are pushed upwardly by the inclined surface 6b so that sharp end portion of each stopper piece 13 cuts into the inner peripheral wall of the cylinder 1. Consequently, the piston 6 is locked in the cylinder 1 through the stopper pieces 13.

Therefore, the piston 6 is prevented from moving backwards so that the occupant is continuously restrained by the seat belt.

When the load of the occupant further increases, the coil portion 7a is drawn out of the piston 6 after being squeezed by the die portion 6c of the piston 6. As a result, the kinetic energy of the occupant is absorbed.

If the piston operating means operates when the occupant does not wear the seat belt or when the occupant wears the seat belt with an excessively large slack, the piston 6 moves within the cylinder 1 without receiving any tension force of the seat belt so that the stroke of the piston 6 is large.

When the stroke of the piston 6 exceeds a predetermined limit stroke, the coil portion 7a positioned in front of the piston 6 collides against an end wall 11 of the cylinder 1.

The above described collision can be prevented by making the rod 7 short. However, in this case, the joint member 9 attached to the end portion of the rod 7 collides against the wall of the cylinder head 2.

FIG. 3 illustrates the operation of the first embodiment of the seat belt tensioning device when the occupant does not wear the seat belt or wears the seat belt with an excessively large loosening.

The piston 6 moves to the left due to high gas pressure without receiving any tension force of the seat belt.

When the piston approaches to its limit stroke, one end of the flat energy absorbing portion 7Oa which is formed in the end of the rod 7 abuts on the sealing member 3.

Then, the energy absorbing portion 7Oa cuts into the sealing member 3 while being squeezed by a tapered inner peripheral surface of the sealing member 3. As a result, the operating energy for the piston 6 is absorbed.

Therefore, the joint member 9 is prevented from colliding against the cylinder head 2 and the coil member 7a is prevented from colliding against the end wall 11 of the cylinder 1.

Figure 4:
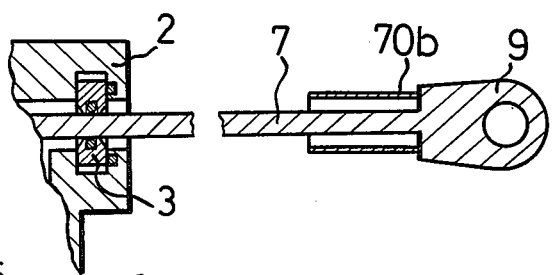
FIG. 4 is a sectional view illustrating one portion of a second embodiment according to the present invention.
Figure 5:
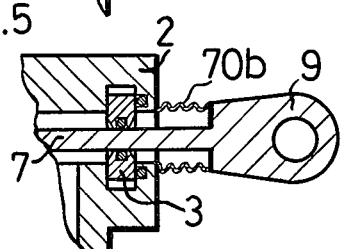
FIG. 5 is a view illustrating the second embodiment under operation.

FIGS. 4 and 5 illustrate one portion of a second embodiment of the seat belt tensioning device according to the present invention.

In the second embodiment, the energy absorbing member 70b is formed of a metallic pipe, and is attached to the end portion of the joint member 9 so as to be opposed to the cylinder head 2.

When the piston 6 connected to the rod 7 moves excessively, the energy absorbing member 70b is sandwiched between the joint portion 9 and the cylinder head 2 strongly to be buckled as shown in FIG. 5. As a result, the operating energy for the piston 6 is absorbed.

Figure 6:
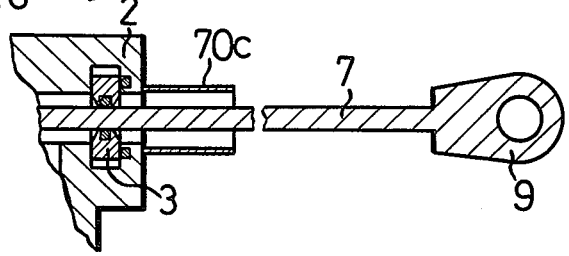
FIG. 6 is a sectional view illustrating one portion of a third embodiment according to the present invention.

FIG. 6 illustrates one portion of a third embodiment of the present invention.

In the third embodiment, the energy absorbing member 70c is formed of a metallic pipe, and is attached to the end surface of the cylinder head 2 so as to be opposed to the joint member 9. The seat belt tensioning device of the third embodiment exhibits the same operational effect as that of the second embodiment.

As described above, the present invention relates to a seat belt tensioning device of a piston cylinder type, by which the damage of the cylinder, due to the full stroke of the piston can be prevented.

According to the present invention, an energy absorbing member which plastically deforms by a predetermined load, is provided between the joint portion which is formed in one end of the rod outside of the cylinder, and the opposed end wall of the cylinder. When the piston moves and approaches its full stroke, the energy absorbing member is strongly sandwiched between the joint portion and the opposed end wall of the cylinder to be crushed thereby. As a result, the piston operating energy is absorbed.

In the seat belt tensioning device of the present invention, it is not required to make the size of the cylinder and the like large and to increase the wall thickness thereof in order to strengthen the device. Only by providing such an energy absorbing member as described above, the end wall of the cylinder can be prevented from being damaged by the piston.

In the present invention, the kinetic energy absorbing member and the piston return stop means are not limited to those shown in the preceding embodiments.

The present invention can be widely applied to the seat belt tensioning device of a piston-cylinder type other than the device shown in the preceding embodiments.

Having now fully described the invention, it will be apparent to one of ordinary skill in the art that many changes and modifications can be made thereto without departing from the spirit or scope of the invention as set forth herein.

What is claimed is:

1. A seat belt tensioning device to be mounted on a vehicle, comprising:

a cylinder installed within a room of the vehicle;
a piston slidably inserted within said cylinder;
a rod, a first end of which is connected to said piston within said cylinder and a second end of which extends outside of said cylinder, passing through a through hole formed in an end wall of said cylinder;
a joint member which is attached to said second end of said rod for connecting said rod to a seat belt;
a piston operating means for moving said piston in one direction in which said piston leaves said end wall of said cylinder at an urgent time such as upon a vehicle impact; and
an energy absorbing member which is formed of plastically deformable material and is disposed between said joint member and said end wall of said cylinder for absorbing the piston operating energy,
said energy absorbing member having a thin portion, of which each end faces said joint member and said end wall of said cylinder, respectively, and of which the thickness is smaller than the diameter of said rod,
whereby said energy absorbing member is strongly sandwiched between said end wall and said joint member and plastically deformed when a stroke of said piston exceeds a predetermined stroke.

2. A seat belt tensioning device according to claim 1, wherein:
said rod is connected to said piston through a plastically deformable member which elongates by a predetermined load.

3. A seat belt tensioning device according to claim 2, wherein:
said plastically deformable member is formed of a metallic coil.

4. A seat belt tensioning device according to claim 1, further comprising:
means provided on said piston for stopping said piston from moving in the direction opposite to said one direction.

5. A seat belt tensioning device according to claim 1, wherein:
said piston operating means comprises:
a powder chamber wherein a propellant is charged; and
an ignition means for exploding said propellant and generating high pressure gas at an urgent time.

6. A seat belt tensioning device to be mounted on a vehicle, comprising:
a cylinder installed within a room of the vehicle;
a piston slidably inserted within said cylinder;
a rod, a first end of which is connected to said piston within said cylinder and a second end of which extends outside of said cylinder, passing through a through hole formed in an end wall of said cylinder;
a joint member which is attached to said second end of said rod for connecting said rod to a seat belt;
a piston operating means for moving said piston in one direction in which said piston leaves said end wall of said cylinder at an urgent time such as upon a vehicle impact; and
an energy absorbing member which is formed of plastically deformable material and is integrally connected to said second end of said rod, said energy absorbing member being formed of a plate of which the thickness is smaller than the diameter of said rod and of which the width is larger than the diameter of said rod;
whereby said plate collides against said end wall of said cylinder and is strongly sandwiched between said end wall and said joint member and plastically deformed when the stroke of said piston exceeds a predetermined stroke, and is squeezed by said end wall defining said through hole.

7. A seat belt tensioning device according to claim 6, wherein:
an outer opening of said through hole of said cylinder has a tapered surface which expands toward said joint member.

8. A seat belt tensioning device according to claim 6, wherein:
said rod is connected to said piston through a plastically deformable member which elongates by a predetermined load.

9. A seat belt tensioning device according to claim 6, further comprising:
means, provided on said piston for stopping said piston from moving in the direction opposite to said one direction.

10. A seat belt tensioning device according to claim 6, wherein:
said piston operating means comprises:
a powder chamber wherein a propellant is charged; and
an ignition means for exploding said propellant and generating high pressure gas at an urgent time.

11. A seat belt tensioning device to be mounted on a vehicle, comprising:
a cylinder installed within a room of the vehicle;
a piston slidably inserted within said cylinder;
a rod, a first end of which is connected to said piston within said cylinder and a second end of which extends outside of said cyinder, passing through a through hole formed in an end wall of said cylinder;
a joint member which is attached to said second end of said rod for connecting said rod to a seat belt;
a piston operating means for moving said piston in one direction in which said piston leaves said end wall of said cylinder at an urgent time such as upon a vehicle impact; and
an energy absorbing member which is formed of plastically deformable pipe and is disposed between said joint member and said end wall of said cylinder, each end of said pipe facing said joint member and said end wall of said cylinder, respectively,
whereby said pipe is strongly sandwiched between said end wall and said joint member when the stroke of said piston exceeds a predetermined stroke, and is crushed in its axial direction by a predetermined load.

12. A seat belt tensioning device according to claim 11 wherein:
one end of said pipe is attached to said joint member.

13. A seat belt tensioning device according to claim 11, wherein:
one end of said pipe is attached to said end wall of said cylinder.

14. A seat belt tensioning device according to claim 11, wherein:
said rod is connected to said piston through a plastically deformable member which elongates by a predetermined load.

15. A seat belt tensioning device according to claim 11, further comprising:
means, provided on said piston for stopping said piston from moving in the direction opposite to said one direction.

16. A seat belt tensioning device according to claim 11, wherein:
said piston operating means comprises:
a powder chamber wherein a propellant is charged; and
an ignition means for exploding said propellant and generating high pressure gas at an urgent time.

* * * * *